United States Patent [19]

Ritsema

[11] 3,790,224

[45] Feb. 5, 1974

[54] MODULATOR FOR ADAPTIVE BRAKING SYSTEM

[75] Inventor: Irving R. Ritsema, South Bend, Ind.

[73] Assignee: The Bendix Corporation, South Bend, Ind.

[22] Filed: Sept. 14, 1972

[21] Appl. No.: 289,194

[52] U.S. Cl. .............. 303/21 F, 188/181 A, 303/61
[51] Int. Cl. ............................................. B60t 8/02
[58] Field of Search ..................... 303/21, 61–63, 303/68–69; 188/181

[56] References Cited
UNITED STATES PATENTS

| | | | |
|---|---|---|---|
| 3,597,012 | 8/1971 | Packer et al. ..................... | 303/21 F |
| 3,403,945 | 10/1968 | Dewar et al. ..................... | 303/21 F |
| 3,449,019 | 6/1969 | Walker ............................ | 303/21 F |

Primary Examiner—Duane A. Reger
Assistant Examiner—D. C. Butler
Attorney, Agent, or Firm—Ken C. Decker; William N. Antonis

[57] ABSTRACT

A modulator for an adaptive braking system is disclosed which relieves braking pressure in the brakes of the wheels controlled by the system when an incipient skidding condition is sensed. The modulator includes the usual differential pressure responsive piston slidably mounted within a housing and movable to a position terminating fluid communication to the controlled brakes and thereafter relieving braking pressure when the modulator is actuated. The modulator is controlled by an electrically operated valve which is responsive to the output of the logic controller used in the adaptive braking system. The electrically operated valve normally communicates a pressure differential across the differential pressure responsive piston which assists the spring which maintains the differential pressure responsive piston in a position permitting fluid communication to the vehicle brakes. However, when an incipient skidding condition is sensed and the electrically operated valve means is actuated, the latter reverses the pressure differential across the differential pressure responsive piston to urge the latter in opposition to the resilient means to first terminate the braking pressure communication to the controlled brakes and to thereafter relieve braking pressure.

2 Claims, 1 Drawing Figure

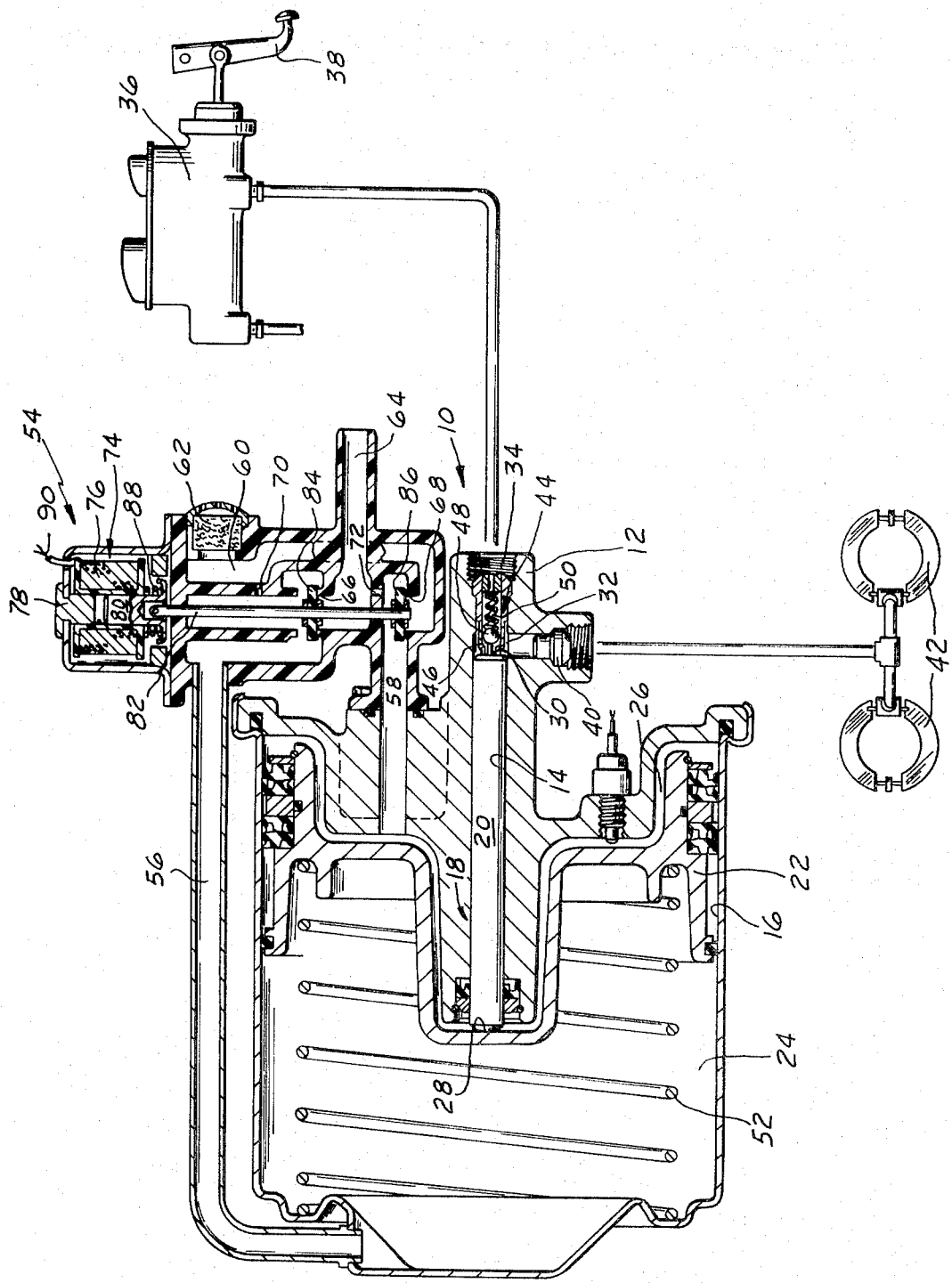

MODULATOR FOR ADAPTIVE BRAKING SYSTEM

BACKGROUND OF THE INVENTION

This invention relates to a modulator for an adaptive braking system.

Adaptive braking systems require a modulator which is responsive to an output signal from a control unit to decay braking pressure in the brakes of the wheels controlled by the adaptive braking system. In existing systems, the modulator is powered by a differential pressure responsive piston which is operated off of the manifold vacuum in the vehicle's engine. However, vacuum operated modulators of this type which are in commercial use today are quite large and bulky. Since the engine compartment of modern motor vehicles has become increasingly crowded in recent years, due to styling changes and to smog control equipment required by Federal regulation, there is little or no room in the engine compartment of existing vehicles for adaptive braking modulators of the large size presently manufactured.

SUMMARY OF THE INVENTION

Therefore, an important object of my invention is to substantially reduce the size of existing vacuum actuated adaptive braking modulators, or, in the alternative, to enable vacuum modulators of existing size to be operated at substantially lower vacuum levels.

Another important object of my invention is to substantially reduce the size of the modulator spring required to maintain the modulating piston in the position permitting communication to the brake wheels by communicating a pressure differential across this piston which assists the spring in maintaining the piston in the normal condition.

Still another important object of my invention is to provide a valve for a vacuum-actuated modulator which normally communicates a pressure differential across the pressure differential responsive piston tending to hold the latter in the normal position permitting communication through the modulator to the vehicle's brakes, but which is actuable when an incipient skidding condition is sensed to reverse the pressure differential across the piston to urge the latter in a direction relieving braking pressure.

BRIEF DESCRIPTION OF THE DRAWINGS

The sole FIGURE of the drawings is a schematic illustration of a vehicle braking system with a modulator made pursuant to the teachings of my present invention illustrated in cross section.

DETAILED DESCRIPTION

Referring now to the drawings, an adaptive braking modulator generally indicated by the numeral 10 includes a housing 12 defining a bore 14 and a chamber 16 therewithin. Pressure differential responsive means generally indicated by the numeral 18 includes a displacement piston 20 slidably mounted in the bore 14 and an activating piston 22 which is slidably mounted in the chamber 16 and which divides the latter into a rear cavity 24 and a front cavity 26. One end 28 of the displacement piston 20 abuts the activating piston 22 and the other end 30 of displacement piston 20 cooperates with corresponding end of the bore 14 to divide a fluid compartment 32 therebetween. An inlet port 34 communicates the compartment 32 with one side of a conventional split system master cylinder 36. The other side of the master cylinder 36 is communicated to the other brakes of the vehicle (not shown). Pressure is developed in the master cylinder 36 when a brake application is effected by operation of a conventional foot pedal 38 mounted in the vehicle operator's compartment. An outlet port 40 communicates the chamber 32 with the brakes 42 of the wheels controlled by the modulator 10. A check valve generally indicated by the numeral 34 is located in the chamber 32 and controls communication between the inlet port 44 and the outlet port 40.

Valve means 44 includes a valve seat 46 and a valve element 48. A spring 50 yieldably urges the valve elemnt 48 toward the valve seat 46; however, the displacement piston 20 normally urges the valve element 48 away from the valve seat 46 to permit fluid communication from the inlet port 34 to the outlet port 40. The displacement piston 20 is maintained in the position illustrated in the drawings holding the valve element 48 away from the valve seat 46 by the modulator return spring 52 mounted in the rear cavity 24 and which acts against the leftwardmost side of the activating piston 22. Since the end 28 of displacement piston 20 is engaged with the activated piston 22, the latter is urged toward the position illustrated in the drawing by the return spring 50.

The modulator 10 is operated by an electrically actuated valve generally indicated by the numeral 54. The valve 54 includes a first passage 56 communicated with the rear cavity 24; a second passage 58 communicated with the front cavity 26; a third passage 60 which is communicated with the atmosphere through a filter 62; and a fourth passage 64 which is communicated with a vacuum source such as the manifold vacuum of the vehicle engine. A first valve seat 66 is disposed between the first passage 56 and the fourth passage 64 and a second valve seat 68 is disposed between the second passage 58 and the third passage 60. A first bleed orifice 70 extends through the common wall between passages 60 and 56 and permits fluid communication at a limited rate between the third passage 60 and the first passage 56 and a second bleed orifice 72 extends through the common wall between passages 64 and 58 and similarly permits limited fluid communication between the fourth passage 64 and the second passage 58.

The electrically operated valve 54 includes a solenoid generally indicated by the numeral 74. Solenoid 74 includes a coil 76 and a pole piece 78 which extends into the coil 76. An armature 80 also extends into the core of the coil 76, and an actuating rod 82 extends from the armature 80 and mounts a first valve element 84 which is adapted to engage the valve seat 66 and a second element 86 which is adapted to engage the valve seat 68. A spring 88 yieldably urges the armature 80, and therefore the activating rod 82, downwardly, viewing the FIGURE, thereby urging the valve element 84 into sealing engagement with the valve seat 66 and urging the valve element 86 into sealing engagement with the valve seat 68. Terminals 90 are provided to connect the coil 76 with the output terminals of the aforementioned electronic control unit (not shown), so that when the latter produces an output signal the coil 76 will be energized.

MODE OF OPERATION

The various components of the modulator 10 are illustrated in the drawings in the position which they assume when the brake application is effected that does not require operation of the adaptive braking system. In this condition, the rear cavity 24 is communicated to atmospheric air pressure through the first passage 56, the orifice 70, and the third passage 60. Similarly, the front cavity 26 is communicated to engine manifold vacuum through the second passage 58, the bleed orifice 72, and the fourth passage 64. Therefore, a pressure differential acts across the activating piston 22 yieldably urging the latter to the right viewing the FIGURE, toward the position illustrated in the drawing. Since the end 28 of displacement piston 20 abuttingly engages the activating piston 22, the force urging the piston 22 to the right viewing the FIGURE, created by the differential air pressure across the piston 22 in conjunction with the force of the spring 52, is sufficient to maintain the valve element 48 away from the valve seat 46 to permit substantially uninhibited fluid communication of braking pressure from the inlet port 34 to the outlet port 40 and therefore to the brakes 42. Since in prior art vacuum modulators the spring 52 had to be of sufficient strength to maintain the valve element 48 away from the valve element 46, a substantially stronger spring was necessary and consequently the diameter of the activating piston 22 also had to be increased, since sufficient pressure differential had to be created across the piston 22 when an adaptive braking cycle was initiated to overcome the force of the spring 52. However, in the present invention, the strength of the spring 52 may be much lower, since the pressure differential communicated across the piston 22 normally assists the spring in maintaining the piston 20 in the position shown.

When a brake application requiring operation of the adaptive braking system is initiated, the aforementoned electronic control unit (not shown), upon sensing an incipient skidding condition, generates an output signal which is transmitted to the coil of 76 through the terminals 90 to energize the coil 76. Energization of the coil 76 moves the armature 80, and therefore the activating rod 82, upwardly viewing the drawing. Movement of the rod 82 lifts the valve elements 84 and 86 off of their corresponding valve seats 66 and 68 respectively, to thereby communicate the rear cavity 24 with the engine vacuum through the first passage 56 and the fourth passage 64, and to communicate the first cavity 26 with atmospheric pressure through the second passage 58 and the third passage 60. It will be noted that, since the areas of the passages 56, 58, 60, and 64 are much greater than the areas of the orifices 70 and 72, the pressure level in the passage 56, and therefore in the cavity 24 will quickly become substantially the same as the engine vacuum, and the pressure in the front cavity 26, will quickly become substantially the same as atmospheric pressure. Therefore, a pressure differential is communicated across the activating piston 22 which urges the latter to the left viewing the FIGURE, in opposition to the resiliency of the spring 52. The fluid pressure in the chamber 32 acting upon the end 30 of displacement piston 20, also urges the latter to the left to maintain engagement of the end 28 of the piston 20 with the piston 22. As the displacement piston 20 is urged to the left, the valve element 48 first engages the valve seat 46 to thereby terminate further fluid communication between the inlet port 34 and the outlet port 40. Further movement of the displacement piston 20 to the left viewing the FIGURE enlarges the volume of the chamber 32, reducing the fluid pressure level communicated to the brakes 42, thereby relieving the braking pressure in the latter.

When the electronic control unit terminates the signal to the terminals 90, a brake pressure build at a controlled rate is initiated. Upon the de-energization of the coil 76, the spring 88 urges the valve elements 84 and 86 back into sealing engagement with corresponding seats 66 and 68, thereby terminating communication between the rear cavity 24 and vacuum and also terminating communication between the front cavity 26 with atmospheric pressure. Atmospheric pressure thereafter bleeds through the build orifice 70 between the third passage 60 and the first passage 56 to thereby gradually restore pressure in the rear cavity 24. At the same time, the bleed orifice 72 permits gradual bleed of the atmospheric pressure in the front cavity 26 to engine vacuum through the fourth passage 64. Therefore, the activating piston 22, and the displacement piston 20, are slowly urged to the right, viewing the FIGURE, gradually building braking pressure in the rear brakes 42 and thereafter urging the valve element 48 away from the valve seat 46, to thereby again permit fluid communication from the master cylinder 36 to the brakes 42.

I claim:
1. A modulator for an adaptive braking system:
a housing defining a chamber therewithin having an inlet, an outlet, and valve means for regulating fluid communication between said inlet and outlet;
pressure differential responsive means for controlling said valve means, said pressure differential responsive means being shiftable from a normal position holding said valve means open to a position closing said valve means, said pressure differential responsive means thereafter moving to expand the volume of said chamber to thereby reduce the fluid pressure level at said outlet;
resilient means yieldably urging said pressure differential responsive means to said normal position; and
electrically operated valve means actuatable from a normal condition communicating higher fluid pressure on one side of said pressure differential responsive means and a lower fluid pressure on the other side of the latter whereby the pressure differential across said pressure differential responsive means assists said resilient means to urge the pressure differential responsive means to said normal position, said electrically actuated valve means being actuatable to an applied condition communicating a higher fluid pressure on said other side of said pressure differential responsive means and a lower pressure on said one side of the latter, whereby the pressure differential across said pressure differential responsive means urges the latter away from said normal position in opposition to said resilient means;
said electrically operated valve means including first passage means communicated with said one side of said pressure differential responsive means, second passage means communicated to said other side of the latter, third passage means communicated with said higher fluid pressure, and fourth passage means communicated with said lower fluid pressure;

said electrically operated valve means in said normal condition communicating said first passage means with said third passage means and said second passage means with said fourth passage means, said electrically operated valve means being actuatable to said applied condition to communicate said first passage means with said fourth passage means and said second passage means with said third passage means;

at least a portion of said first and third passage means being disposed adjacent one another, said first and third passage means having a common wall separating said first and third passages; and a flow restricting orifice extending through said common wall to communicate said first and third passage means to limit the rate that the higher fluid pressure is communicated to said one side of the pressure responsive means after return of the electrically operated valve means to its normal condition after movement of the latter to its applied condition.

2. The invention of claim 1:

at least a portion of said second and fourth passage means being disposed adjacent one another, said second and fourth passages having a common wall separating said second and fourth passage means, and a flow restricting orifice extending through said common wall between the second and fourth passage means to control the rate of fluid communication from said other side of the pressure differential responsive means when the valve means is returned to the normal condition.

* * * * *